United States Patent

Norcia

[11] Patent Number: 5,461,200
[45] Date of Patent: Oct. 24, 1995

[54] COMPLIANT STIFFENER FOR LONG FLEXIBLE MEMBERS

[76] Inventor: James Norcia, 132 Cypress Trail, Jensen Beach, Fla. 34957

[21] Appl. No.: 259,690

[22] Filed: Jun. 13, 1994

[51] Int. Cl.⁶ .................................................... H01B 7/00
[52] U.S. Cl. ................ 174/135; 174/41; 174/91
[58] Field of Search .................. 174/135, 40 R, 174/41, 91

[56] References Cited

U.S. PATENT DOCUMENTS

| | | | |
|---|---|---|---|
| 3,344,226 | 9/1967 | Harse | 174/70 |
| 3,568,308 | 3/1971 | Plaskon | 174/135 X |
| 4,160,872 | 7/1979 | Lundberg | 174/101.5 |
| 4,378,462 | 3/1983 | Arnold | 174/70 |
| 4,422,478 | 12/1983 | Pentney et al. | 138/168 |
| 4,472,468 | 9/1984 | Tailor et al. | 428/57 |
| 4,536,611 | 8/1985 | Butler | 174/41 |
| 4,723,822 | 2/1988 | Merdic | 439/502 |
| 4,856,867 | 8/1989 | Gaylin | 174/41 X |
| 4,934,340 | 6/1990 | Ebling et al. | 128/6 |
| 5,073,682 | 12/1991 | Walling et al. | 174/70 A |
| 5,130,496 | 7/1992 | Jenkins | 174/135 |
| 5,168,128 | 12/1992 | Thomsen | 174/135 |
| 5,322,132 | 6/1994 | Franks, Jr. | 174/41 |

*Primary Examiner*—Kristine L. Kincaid
*Assistant Examiner*—Cheryl R. Figlin
*Attorney, Agent, or Firm*—Alvin S. Blum

[57] ABSTRACT

Long flexible members such as hoses, electric cords and cables tend to be springy and elastic. They are not easily coiled and stored. They tend to straighten out when bent into a desired shape. They tend to tangle and interfere with operations. The invention incorporates an elongate wire element running parallel to the long axis of the flexible member. The wire element is encased in the covering of the flexible member. The wire element is a conformable shape-retaining material such as a compliant soft iron or steel. It renders the entire member shape-retaining so that it may be conveniently coiled for storage or positioned for use. An embodiment for retrofitting an existing flexible member provides the wire element encased in a covering which wraps around a flexible member and then seals closed to form a shape retaining sleeve about the member.

17 Claims, 1 Drawing Sheet

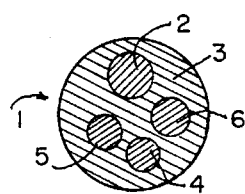
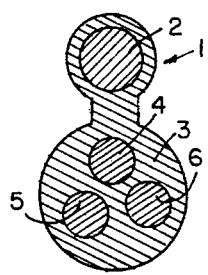
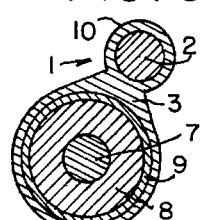
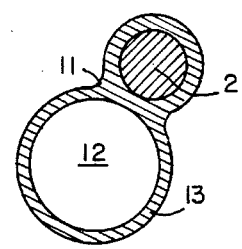
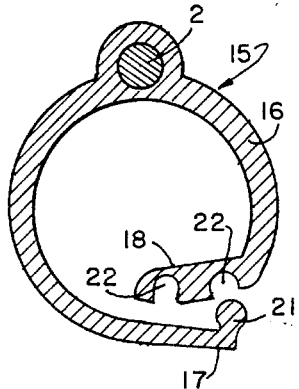
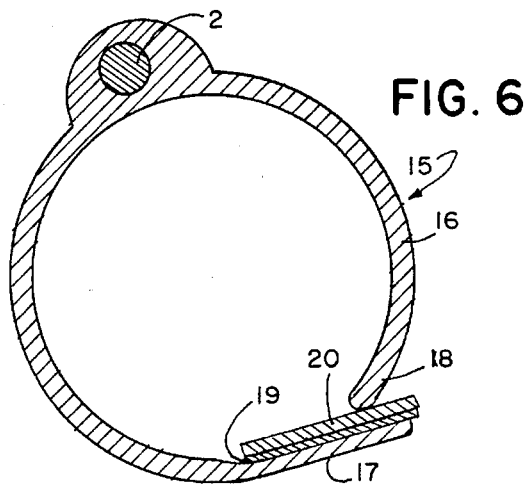
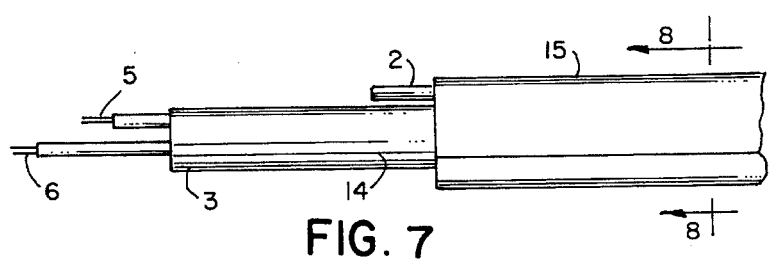
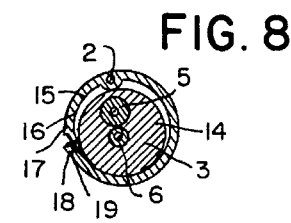

COMPLIANT STIFFENER FOR LONG FLEXIBLE MEMBERS

BACKGROUND OF THE INVENTION

This invention relates to organizing and preventing the tangling of long flexible members such as electric cords, hoses and the like; and more particularly to means for providing a compliant and shape-retaining member parallel to the hoses or conductors that is bendable to a desired shape and that will hold the desired shape of both the shape-retaining member and the flexible member of which it is a part or to which it is attached.

Long flexible members such as coaxial cables, electric appliance cords, extension cords, and tubing are often springy or elastic. When coiled or positioned in a desired operating configuration, they may spring from that coil or configuration, tangling or interfering with operation.

U.S. Pat. No. 5,168,128 issued Dec. 1, 1992 to Thomsen discusses the problem, the prior art, and teaches attaching many rigid sections to the cord to prevent entanglement. Thomsen's invention is advantageous for storing certain cords, but does leave many problems of springy cords unresolved. For example, in open heart surgery there may be four tubes carrying liquid, a vacuum tube and several cords carrying electrical current or signals traversing the operating table. Any movement may cause these to move to an inappropriate location, contaminating the operative field or dropping to the floor. The tubes may have to be individually clipped to the drapes with clamps.

When working with an electrical appliance such as a soldering iron, the electric power cord may inadvertently move onto hot surfaces. A coaxial TV cable may be difficult to position effectively because the woven metal shield makes the cable act like a spring. It is well known in the art to provide an aerial electric cable with a high tensile strength messenger strand to support the weight of the cable between support poles. The strand is generally quite elastic and springy. Consequently these cables tend to be even more springy than those without the messenger strand, but do not pose any problems because of the way in which they are stored on spools and used.

SUMMARY OF THE INVENTION

It is accordingly an object of the invention to provide a shape retaining element running along the length of a long flexible member so that the long flexible member will be bendable into a desired shape and will remain in the desired shape for operation or storage.

The shape retaining member or stiffener of the invention comprises an elongate, non resilient, compliant, inelastic wire that is either encased in the covering of the long flexible member or is attachable thereto along its length or that portion of its length whose properties are to be changed from resilient to non resilient and conformable.

The term long flexible member will hereinafter be used to refer to ropes, cables with single or multiple electric current or signal carrying conductors, coaxial cables, radiation conducting cables such as optical fiber cables, and tubes with one or more lumens for transmission of fluids or the like. These long flexible members generally share the property of resilience or elasticity. When they are coiled, they tend to uncoil. When they are bent into a particular shape, they tend to straighten out when released.

When the stiffener of the invention is applied to the long flexible member, it may then be coiled, folded or bent into a desired shape and it will retain that shape when released.

The elongate, non resilient, compliant wire that is employed in the invention may be of the type generally referred to as baling or mechanic's wire. It is often soft iron or steel and may be zinc coated. It was used for baling hay. It was fastened by simply twisting together. The twist would retain its shape when released.

This type of wire has also been used in other fastening applications such as the twist ties for plastic bags. We have not found evidence that the shape retaining properties of this wire has been used to convert long flexible members into compliant members. The compliant wire may be incorporated into the wall of the tube or the covering of the cable.

In an alternative embodiment of the invention, the compliant wire is embedded within its own covering. That covering is arranged for attachment along the length of the long flexible member. This attachment may be by encircling the flexible member and closing the circle with an adhesive or other closure so that the stiffener then becomes a part of the long flexible member which converts it to a long compliant member.

These and other objects, advantages and features of the invention will become apparent when the detailed description is studied in conjunction with the drawings.

BRIEF DESCRIPTION OF THE DRAWINGS

FIG. 1 is a sectional view through an integral cable of the invention.

FIG. 2 is a sectional view of another integral cable of the invention.

FIG. 3 is a sectional view of an integral coaxial cable of the invention.

FIG. 4 is a sectional view of an integral tube of the invention.

FIG. 5 is a sectional view of another embodiment of the invention for retrofitting a long flexible member.

FIG. 6 is a sectional view of another embodiment of the invention for retrofitting a long flexible member.

FIG. 7 is a side elevation view of a retrofitted long flexible member partially broken away.

FIG. 8 is a sectional view taken on line 8—8 of FIG. 7.

DETAILED DESCRIPTION OF PREFERRED EMBODIMENTS

Referring now first to the integral cable 1 shown in section in FIG. 1, a conformable soft iron wire 2, approximately 2 millimeters in diameter is enclosed within an insulating covering 3 which also encloses a copper ground wire 4 and two copper conductors 5, 6. This would be the configuration of an electrical appliance cord or an extension cord. It would have all of the usual attributes of a convention electric cord with the added feature of holding whatever shape into which it is bent, such as folded or coiled for storage, or bent into an out-of-the-way position so that excessive cord does not interfere with operation. The conductors 5, 6 may be optical fibers.

The integral cable 1 shown in FIG. 2 provides the conformable wire 2 in position remote from the conductors as may be required for electrical isolation in certain applications and for ease of connection.

FIG. 3 shows a cable 1 comprising a coaxial arrangement of central conductor 7 separated by dielectric 8 from a woven wire coaxial sleeve 9. The conformable wire 2 is enclosed within the insulating covering 3 but off to one side 10, where it can be readily cut off for applying a connector in a conventional fashion.

Referring now to FIG. 4, a tube 11, such as a rubber or plastic hose is provided with a lumen 12 for passage of a fluid such as a gas or liquid. The wall 13 of such a tube generally makes it very elastic and hard to control. It will tend to straighten out when not confined. The conformable, soft iron or steel wire 2 also encased within the wall 13 will cause the tubing to retain the shape into which it is bent to greatly enhance its utility. Alternatively, a rope, cable or other springy, elongate member may be contained within lumen 12 to convert it into a conformable member.

Referring now to FIGS. 7 and 8, a conventional, long flexible member 14 which has an inherent resilience is converted to a conformable cord by retrofitting the cord with the conformable stiffener device 15 which contains a compliant and conformable wire 2 within a wrap around plastic sleeve 16. The edges 17, 18 of the sleeve overlap and seal together.

As best seen in FIGS. 5 and 6, the stiffener device 15 has overlapping edges 17 and 18 which may be adjusted for holding members of various diameters. The closure means for joining the edges may take the form of various sealing methods well known in the art. FIG. 6 shows an adhesive strip 19 protected by a release paper 20 which may be peeled off. FIG. 5 shows interlocking spline 21 and various grooves 22. These devices may be applied to a member without first disconnecting the member since they simply wrap around the portion of the member to be stiffened and rendered conformable. They may be wrapped around several members simultaneously so as to better organize an assemblage of long flexible members such as in an operating room.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A stiffener for rendering conformable and shape-retaining a long flexible member having a long axis, said stiffener comprising:

an elongate, shape-retaining, bendable, inelastic wire element extending substantially parallel along said long axis;

a covering means encasing said wire element and providing at least one lumen extending along said long axis and adjacent said wire element, said wire element being outside said lumen;

said at least one lumen arranged for containing therein at least one item selected from the group consisting of fluid, electrical conductor, optical conductor, rope and cable, said stiffener being sufficiently inelastic and said wire element providing sufficient stiffness to maintain said item in the shape into which it is bent.

2. The stiffener according to claim 1, in which said at least one lumen is open all along the length thereof and is provided with sealing means for sealing closed said at least one lumen after said covering means has been wrapped around said at least one item.

3. The stiffener according to claim 2, in which said sealing means comprises adhesive.

4. The stiffener according to claim 2, in which said sealing means comprises groove and spline elements.

5. The stiffener according to claim 1, in which said wire element comprises compliant iron.

6. The stiffener according to claim 1, in which said wire element comprises a compliant steel.

7. A long flexible member that is conformable and shape-retaining, and having a long axis, said member comprising:

an elongate, conformable, inelastic wire means for shape-retaining along said long axis;

at least one conductor means for conducting an item selected from the group consisting of fluid, electricity, and radiation, said conductor means extending parallel to said long axis; and covering means encasing and spacing apart from one another said wire means and said at least one conductor means, wherein said member is sufficiently inelastic and said wire means provides sufficient stiffness to said member to maintain a shape into which said member is bent.

8. The member according to claim 7, in which said wire means comprises a metal.

9. The member according to claim 8, in which said item conducted is electricity.

10. A stiffener for rendering inelastic a long, flexible, elastic member, having a long axis, by attachment thereto, said stiffener comprising:

an elongate, flexible, conformable, inelastic wire means for shape-retaining extending along said long axis;

covering means extending along said long axis, said covering means completely encasing said wire means and providing means for covering and attaching to said elastic member all along said long axis; and wherein said stiffener is sufficiently inelastic that said wire means provides sufficient stiffness to maintain said member in the shape into which it is bent.

11. The stiffener according to claim 10, in which said covering and attaching means includes means for wrapping around said elastic member and sealing means for sealing said covering and attaching means to itself to enclose said elastic member within said covering and attaching means.

12. The stiffener according to claim 11, in which said sealing means comprises adhesive.

13. The stiffener according to claim 11, in which said sealing means comprises groove and spline elements.

14. The stiffener according to claim 10, in which said wire means comprises a metal.

15. The stiffener according to claim 10, in which said wire means comprises iron.

16. The stiffener according to claim 11, in which said wire means comprises a metal.

17. The stiffener according to claim 11, in which said wire means comprises iron.

* * * * *